(No Model.)
A. FLECKENSTEIN.
FRUIT DRIER.
No. 584,817. Patented June 22, 1897.
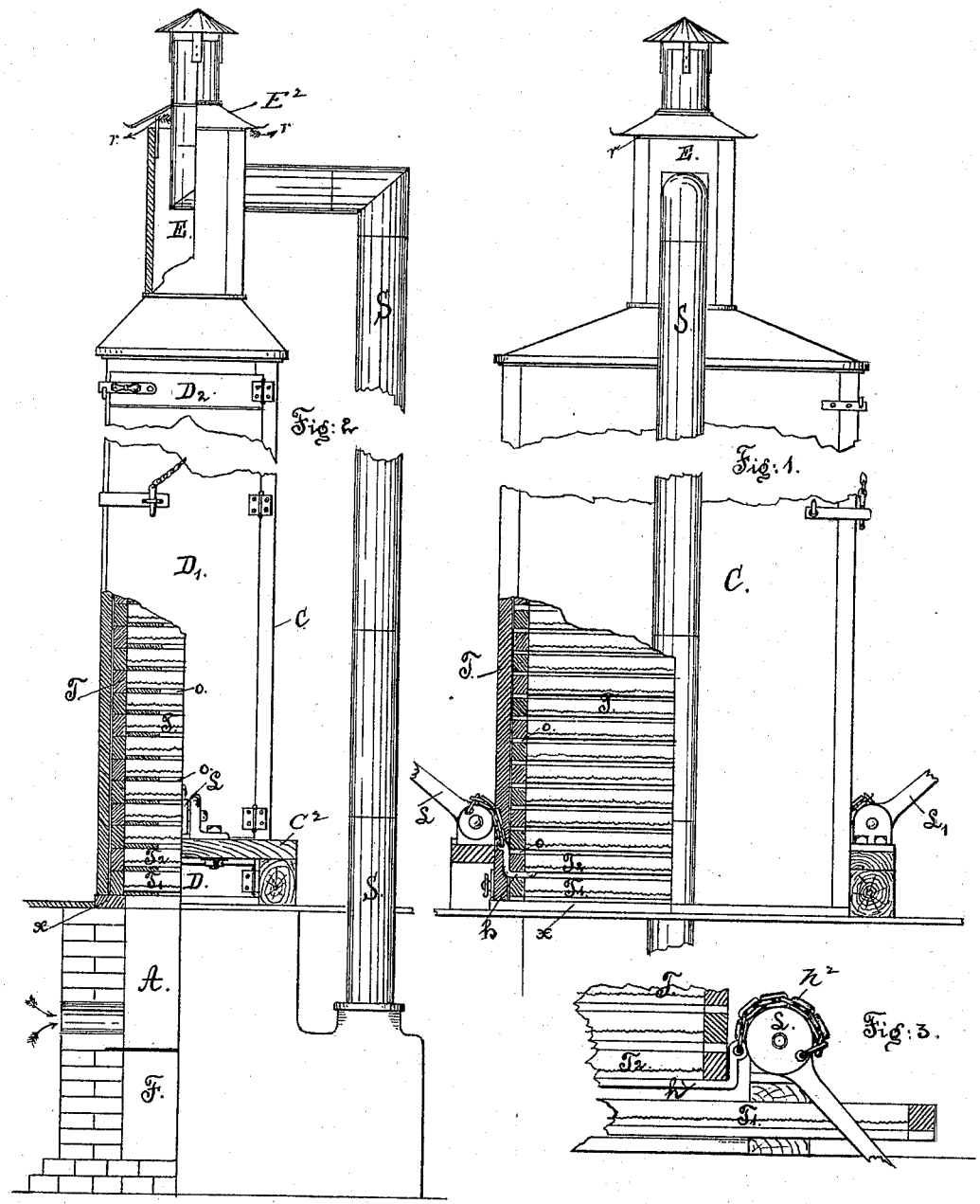
Witnesses:
A. Ohlhoff
W. T. Jacobsen
Inventor:
Adam Fleckenstein

UNITED STATES PATENT OFFICE.

ADAM FLECKENSTEIN, OF PORTLAND, OREGON.

FRUIT-DRIER.

SPECIFICATION forming part of Letters Patent No. 584,817, dated June 22, 1897.

Application filed February 24, 1896. Serial No. 580,585. (No model.)

*To all whom it may concern:*

Be it known that I, ADAM FLECKENSTEIN, a citizen of the United States, residing at Portland, in the county of Multnomah, State of Oregon, have invented a certain new and useful Improvement in Fruit-Driers, of which the following is a specification, reference being had to the accompanying drawings.

My invention relates to fruit-driers in which the trays are stacked on top of each other to cause heated air to ascend through the fruit placed upon each tray; and the objects of my invention are to provide simple and inexpensive means to lift the whole stack of trays, except the bottom tray, to permit the removal of the latter with speed and convenience. I attain these objects by the mechanism illustrated in the accompanying drawings, in which—

Figure 1 is a side view, partly broken away and also partly in section, of a fruit-drier constructed in accordance with my invention. Fig. 2 is an end view, partly broken away and also partly in section, of said fruit-drier. Fig. 3 is a longitudinal vertical section of the lower portion of the fruit-drier, showing the trays and supporting hook and lever on a larger scale and one of the trays partly removed.

The walls of the fruit-drying compartment C are substantially air-tight, being preferably made of flooring-boards covered with asbestos paper or other suitable material, and rest upon the walls of the air-chamber A, that inclose the furnace F. The compartment C is preferably made to hold about fifty trays T, of about the size of eighteen by forty-two inches. The interior of the compartment C is about said size, so that its walls serve to guide the trays when descending or slightly ascending therein.

At each end of the exterior of the compartment C, near the bottom thereof, there is pivotally mounted a lever L in bearings placed upon a removable small platform $C^2$. To the lever L is attached one end of a chain $h^2$, having a hook $h$ on the opposite end. The lever L is mounted high enough so that its hook $h$ hangs below its pivot, and the operator after having opened the lower end door D of the apparatus and lifted the free end of the lever can easily push the hook $h$ under the bottom of the second-lowest tray $T^2$ within a notch O made for that purpose in the bottom of each tray in the central portion of each end.

After the apparatus has been filled with trays loaded with fruit and subjected to heated air and it is time to remove the lowest tray T', as the fruit therein will naturally become dried first, the free ends of the levers L are depressed by the operator and the entire stack of trays is lifted up sufficiently so that if the lower end door D is opened the lowest tray T' can be pulled out and removed by the operator or his assistant. The free ends of the levers L are then slowly raised again, and the remaining stack of trays slides down by its own weight, guided and kept in place by the walls of the compartment C, onto the bottom frame $x$, that rests on the walls of the air-chamber A, that inclose the furnace F. Then the hook $h$ of each lever is removed and pushed again in the notch under the bottom of the now second-lowest tray $T^2$. The door D is then closed and the upper end door $D^2$ opened and a fresh tray placed on top of the other trays and said door $D^2$ closed again.

The smoke-stack S of the furnace F stands outside of the compartment C, and its upper end leads into the hot-air flue E of the drier and out from the top of its cap $E^2$, by which means an additional draft is created that relieves the compartment quickly of any bad odor caused by the drying fruit without any danger of having the gases of the fuel combustion thrown down into the fruit by gusts of wind. The cap also prevents dust from falling therein, but it has exits $r$ under it to allow the moist hot air to escape.

To facilitate the introduction or the removal of all the trays T or to allow a person to enter and clean the compartment C, one end thereof is provided with three air-tight doors D D' $D^2$. Over the furnace F two or more compartments, as C, may be placed, and each can be operated by its own levers L.

I am aware that fruit-driers have been provided with wire-screen trays laid one on top of the other in stacks and that the furnace-flue has been made to pass through and discharge in the exit-passage of the hot-air flue and do not claim these features.

Having now fully described my invention, I claim—

1. In a fruit-drier the combination of the drier-compartment having side walls the whole height thereof, and three doors one above the other in one end, a series of superposed trays adapted to slide up and down against said walls, a removable platform in front of and over the bottom door, lever-bearings upon said platform, a lever pivoted on said bearings, and a chain having one end secured to said lever and the other end provided with a hook substantially as described.

2. In a fruit-drier the combination of the drier-compartment having side walls the whole height thereof and three doors one above the other in one end, a series of superposed trays adapted to slide up and down against said walls, and means to elevate said trays as described, with the hot-air flue E having the raised cap $E^2$, a furnace under the drier-compartment, and its smoke-flue entering the side of the hot-air flue and passing through and above the cap substantially as described.

In testimony whereof I affix my signature, in the presence of two witnesses, this 15th day of February, 1896.

ADAM FLECKENSTEIN.

Witnesses:
A. OHLHOFF,
W. T. JACOBSEN.